Nov. 12, 1963 J. LADELL 3,110,804
X-RAY SPECTROGRAPH WITH MOVABLE DETECTOR CONSTRAINED TO
ROTATE AT A CONSTANT RATE OF CHANGE
Filed Dec. 10, 1959

INVENTOR.
JOSHUA LADELL
BY
AGENT.

United States Patent Office 3,110,804
Patented Nov. 12, 1963

3,110,804
X-RAY SPECTROGRAPH WITH MOVABLE DETECTOR CONSTRAINED TO ROTATE AT A CONSTANT RATE OF CHANGE
Joshua Ladell, Flushing, N.Y., assignor to North American Philips Company, Inc., New York, N.Y., a corporation of Delaware
Filed Dec. 10, 1959, Ser. No. 858,711
10 Claims. (Cl. 250—51.5)

My invention relates to X-ray apparatus such as an X-ray spectrograph or X-ray diffractometer.

It is well known to analyze a specimen of material non-destructively to determine its composition by detecting characteristic X-rays emitted by elements in the specimen when suitably excited, i.e., by electrons of sufficient energy or by X-rays having a wave-length which is shorter than the absorption edge of an element in the specimen. Since that element emits characteristic X-rays when suitably excited, which X-rays have a wave-length characteristic of that particular element, the detection and measurement of the intensity of such X-rays enables one to determine the composition of the specimen quickly and in a non-destructive manner.

If the specimen contains more than one element, each element will emit X-rays having a wave-length characteristic of that element. Consequently, the spectrograph must include means to separate wave-lengths which can be detected separately. It is convenient to use as a detector for the X-rays emitted by the specimen a device which converts X-radiation into electrical pulses which can be measured because such devices have much greater sensitivity than a film, and furthermore, facilitate the measurement of the intensity of the X-rays. Accordingly, it is conventional to provide a crystal monochromator between the specimen and the detector which reflects the radiation of different wave-lengths at different angles, and to move the counter relative to the crystal monochromator to detect individually the several wave-lengths. By using a crystal with known interplanar spacing $d$ and measuring the angle, $\theta$, at which the wave-length is reflected from the crystal monochromator, the wave-length is determined from the well-known Bragg law:

$$n\lambda = 2d \sin \theta \tag{1}$$

By mechanically linking the detector to the crystal monochromator and rotating the detector at one-half the angular velocity of rotation of the crystal, the wave-length of radiation is directly related to the angle of reflection $\theta$.

This scheme has a shortcoming in that the angular measurements must be converted into wave-lengths. Furthermore, higher order reflections of other elements may interfere with the detection of the particular wave-length corresponding to a particular element in the specimen.

The principal object of my invention is to provide an X-ray spectrograph in which wave-lengths or interplanar spacings can be measured directly and without making angular measurements.

It is another object of my invention to provide a spectrograph in which extraneous higher order reflections are spaced at multiple intervals along a chart rendering their recognition by inspection rather than by calculation.

It is still another object of my invention to improve the line profiles obtained with an X-ray spectrograph and make those line profiles more uniform in shape.

These and further objects of my invention will appear as the specification progresses.

In accordance with my invention, I provide in an X-ray apparatus a special linkage between the crystal and the detector by means of which the detector is rotated at such an angular velocity as to maintain a constant time rate of change of sin $\theta$. The crystal rotates at one-half the angular velocity of the counter as is required. The output of the detector is supplied to a counter which counts the number of pulses produced by the detector, and the output of the counter is furnished to a rate meter recorder sheet driven at a constant linear velocity. The recorded diffraction data is displayed on the sheet on a scale which is directly proportional to the wave-length units, or $1/d$, where $d$ is the interplanar spacing. Except for the linkage and the method of driving the counter detector, the spatial arrangements of all other components of the spectrograph are the same as those known in the art.

The invention will be described with reference to the accompanying drawing in which.

Figure 1:
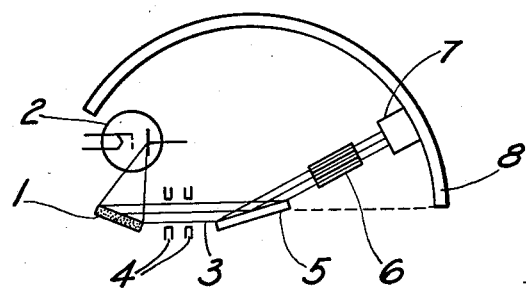
FIG. 1 shows a spectrograph similar to those known in the art.

Specimen 1 is exposed to X-rays generated by X-ray tube 2 and emits characteristic fluorescent X-rays 3, the divergence of which is limited by scattering slits 4, and which are diffracted by a crystal monochromator 5. The diffracted rays are collimated by a collimator 6 and detected by detector 7 mounted on a circular arc, or goniometer 8. The monocrystal and the detector are linked together and driven so that the crystal rotates at one-half the angular speed of the detector. The output of the detector, such as a Geiger-Muller counter, proportional counter, scintillation counter, in the form of electrical pulses, is furnished to a conventional pulse counter (not shown), the output of which is recorded on a conventional rate meter (also not shown).

Figure 2:
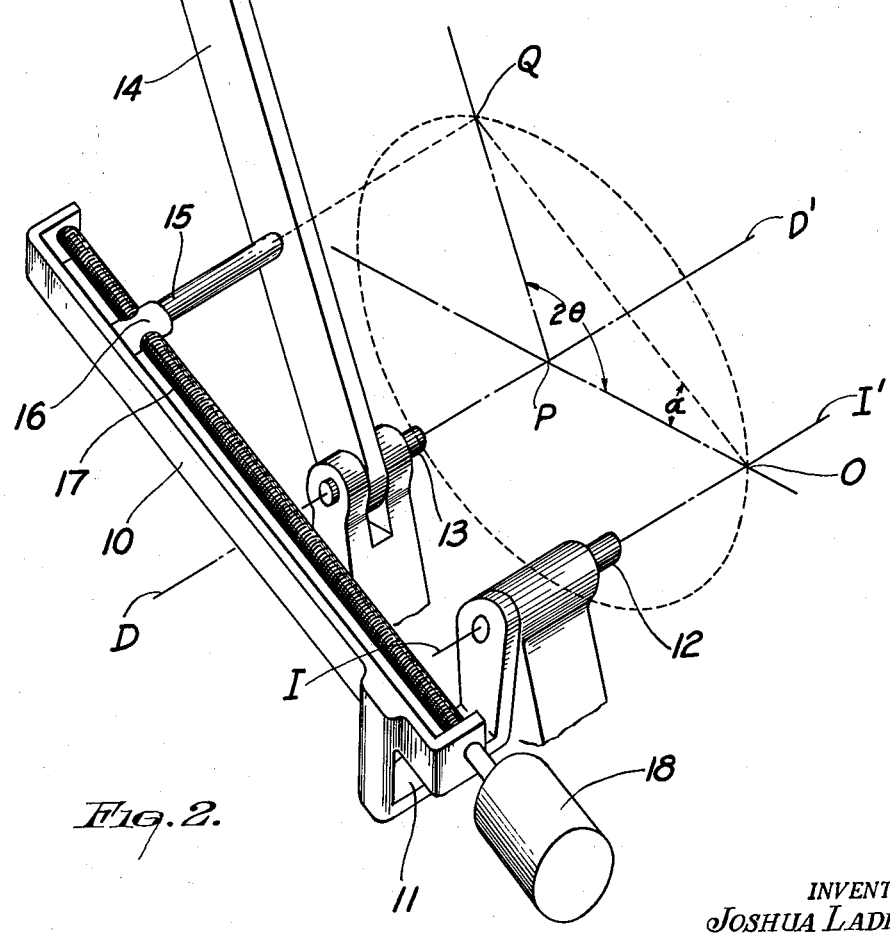
FIG. 2 is a diagrammatic view of my novel linkage assembly.

The novel linkage and counter guide mechanism is shown in FIG. 2. Carriage 10, yoke 11 and spindle 12 comprise one rigid structure. Spindle 12 is constrained by bearings (not shown) and is free to rotate about axis I—I'. The crystal monochromator (not shown in this figure) is rigidly connected to spindle 13 which is maintained by bearings (not shown). Spindle 13 rotates on axis D—D'. Spindle 13 supports counter arm 14, but counter arm 14 rotates about D—D' independent of the rotation of 13. The motion of spindle 13 is synchronous with that of spindle 12, the motion is transferred from 12 to 13 by means of gears not shown.

The detector (not shown) is rigidly supported on arm 14 which also rotates on the axis D—D'. Pin 15, free to rotate in a hole recessed in arm 14, is rigidly fastened to a nut 16 which rides on worm 17. Worm 17, free to rotate within carriage 10, is driven by the synchronous motor 18. When motor 18 is energized, nut 16 is displaced along worm 17.

The time rate of change of the length $\overline{QO}$, the distance from axis I—I' to the center of nut 16 is constant. Since $\overline{QO} = 2\overline{OP} \sin \theta$:

$$d/dt \, (\overline{QO}) = 2\overline{OP} \, d/dt \, (\sin \theta) = \text{constant} \tag{2}$$

The counter rotation, constrained by the motion of nut 16, scans therefore at a rate proportional to wave-length, $\lambda$, since the time rate of change of $\alpha$ is the angular velocity of spindle 12, the angular velocity of the crystal which is linked to spindle 12 is one-half that of the counter angular velocity.

As the detector rotates, it will be censtrained by the motion of nut 16 and the output of the detector will be proportional to the wave-length. Consequently, the rate meter recorder sheet which is driven at a constant linear velocity displays the measurements on a scale which is directly proportional to wave-length units, and no further interpretation of the results is required. Thus, if the chart moves a distance K cm. and the nut 16 is displaced a distance $\overline{2OP}$, the record is calibrated such that $$1A = \frac{K}{2a}$$

(*d* is measured in A.).

For many applications it is desirable to change the *d*-spacing of the crystal monochromator. A novel feature of the invention is manifest if the speed of the rate meter recorder sheet is always maintained proportional to the *d*-spacing of the crystal employed. With this feature, the wave-length calibration is the same for all charts.

Although the invention has been described in connection with X-ray spectroscopy, it is equally applicable to X-ray diffractometry. For diffractometry, where radiation is substantially monochromatic and is incident upon a crystal or crystal powder, the diffraction spectrum is recorded in units directly proportional to $1/d$ rather than angle units $\theta$. In addition, to simplify the interpretation of the data, the organization of diffraction spectra in terms of $1/d$ permits simplification of analyses that are customarily carried out (e.g., indexing of powder lines). Also, in the experimental methods of precision lattice parameters in the method of moments (Ladell, Parrish & Tayler, Acta Crysta., 12, p. 253, 1959), centroids observed from line profiles obtained with this invention need not be corrected for dispersion.

Although the invention has been described in connection with X-rays capable of producing characteristic secondary X-rays from the specimen, it is alternatively possible to excite the specimen by electron bombardment as is well known in the art. Therefore, I do not wish to be limited to the specific embodiment shown as other modifications will be readily apparent to those skilled in the art without departing from the spirit and scope of the invention as defined in the appended claims.

What I claim is:

1. X-ray apparatus comprising means to expose a crystal to X-ray of a given wave-length, means to detect X-rays diffracted by said crystal, means to rotate the crystal about a given axis of rotation, means to move said detection means about said axis of rotation at twice the angular velocity of rotation of the crystal, and means to constrain rotation of the detection means to maintain a constant time rate of change of the sine of the angle at which said X-rays are diffracted by said crystal whereby the detected wave-lengths of X-rays reflected by the crystal are proportional to the interplanar spacings of the crystal.

2. X-ray apparatus comprising means to expose a crystal to X-rays of a plurality of wave-lengths, means to detect X-rays diffracted by said crystal, means to rotate the crystal about a given axis of rotation and thereby diffract X-rays of different wave-lengths at different angles, means to synchronously move said detection means about said axis of rotation at twice the angular velocity of rotation of the crystal, and means to constrain rotation of the detection means to maintain a constant time rate of change of the sine of the angle at which said X-rays are diffracted by said crystal whereby the detected wave-lengths of X-rays reflected by the crystal are proportional to the interplanar spacings of the crystal.

3. X-ray apparatus comprising means to expose a crystal to substantially monochromatic X-rays of a given wave-length, means to detect X-rays diffracted by said crystal to thereby determine the interplanar spacings of said crystal, means to rotate the crystal about a given axis of rotation, means to synchronously move said detection means about said axis of rotation at twice the angular velocity of rotation of the crystal, and means to constrain rotation of the detection means to maintain a constant time rate of change of the sine of the angle at which said X-rays are diffracted by said crystal whereby the wave-lengths of X-rays reflected by the crystal are proportional to the interplanar spacings of the crystal.

4. X-ray apparatus comprising means to expose a crystal to X-rays of a given wave-length, means to detect X-rays diffracted by said crystal, means to rotate the crystal about a given axis of rotation, means to synchronously move said detection means about said axis of rotation at twice the angular velocity of rotation of the crystal, and linkage means connecting said crystal rotation means and said detection moving means to constrain rotation of the detection means to maintain a constant time rate of change of the sine of the angle at which said X-rays are diffracted by said crystal whereby the detected wave-lengths of X-rays reflected by the crystal are proportional to the interplanar spacings of the crystal.

5. X-ray apparatus comprising means to expose a crystal to X-rays of a given wave-length, means to detect X-rays diffracted by said crystal, means to rotate the crystal about a given axis of rotation, means to synchronously move said detection means about said axis of rotation at twice the angular velocity of rotation of the crystal, and linkage means including screw means and a member movable by said screw means connecting said crystal rotation means and said detection moving means to constrain rotation of the detection means to maintain a constant time rate of change of the sine of the angle at which said X-rays are diffracted by said crystal whereby the detected wave-lengths of X-rays reflected by the crystal are proportional to the interplanar spacings of the crystal.

6. X-ray apparatus comprising means to expose a crystal to X-rays of a given wave-length, means to detect X-rays diffracted by said crystal and produce electrical signals corresponding to said X-rays, means to rotate the crystals about a given axis of rotation, means to synchronously move said detection means about said axis of rotation at twice the angular velocity of rotation of the crystal, means to constrain rotation of the detection means to maintain a constant time rate of change of the sine of the angle at which said X-rays are diffracted by said crystal whereby the detected wave-lengths of X-rays reflected by the crystal are proportional to the interplanar spacings of the crystal, and means to record the signals produced by said detector as a function of the wave-length.

7. X-ray apparatus comprising means to expose a crystal to X-rays of a given wave-length, means to detect X-rays diffracted by said crystal and produce electrical signals corresponding to said X-rays, means to rotate the crystal about a given axis of rotation, means to synchronously move said detection means about said axis of rotation at twice the angular velocity of rotation of the crystal, means to constrain rotation of the detection means to maintain a constant time rate of change of the sine of the angle at which said X-rays are diffracted by said crystal whereby the detected wave-lengths of X-rays reflected by the crystal are proportional to the interplanar spacings of the crystal, and means to record the signals produced by said detector on a strip moving at a constant velocity as a function of the wave-length.

8. X-ray apparatus comprising means to expose a crystal to substantially monochromatic X-rays of a given wave-length, means to detect X-rays diffracted by said crystal, means to rotate the crystal about a given axis of rotation, means to synchronously move said detection means about said axis of rotation at twice the angular velocity of rotation of the crystal, means to constrain rotation of the detection means to maintain a constant time rate of change of the sine of the angle at which said X-rays are diffracted by said crystal whereby the detected wave-lengths of X-rays reflected by the crystal are proportional to the interplanar spacings of the crystal, and means to record the signals produced by said detector on a strip moving at a constant velocity as a function of $1/d$, $d$ being the interplanar spacing of the crystal.

9. X-ray apparatus comprising means to expose a crystal to X-rays of a given wave-length, means to detect X-rays diffracted by said crystal and produce electrical signals corresponding to said X-rays, means to rotate the crystal about a given axis of rotation, means to synchronously move said detection means about said axis of rotation at twice the angular velocity of rotation of the crystal, linkage means connecting said crystal rotation means and said detection moving means to constrain rotation of the detection means to maintain a constant time rate of change of the sine of the angle at which said X-rays are diffracted by said crystal whereby the detected wave-lengths of X-rays reflected by the crystal are proportional to the interplanar spacings of the crystal and means to record the signals produced by said detector on a strip moving at a constant velocity as a function of the wave-length.

10. X-ray apparatus comprising means to expose a crystal to X-rays of a given wave-length and produce electrical signals corresponding to said X-rays, means to detect X-rays diffracted by said crystal, means to rotate the crystal about a given axis of rotation, means to synchronously move said detection means about said axis of rotation at twice the angular velocity of rotation of the crystal, linkage means connecting said crystal rotation means and said detection moving means to constrain rotation of the detection means to maintain a constant time rate of change of the sine of the angle at which said X-rays are diffracted by said crystal whereby the detected wave-lengths of X-rays reflected by the crystal are proportional to the interplanar spacings of the crystal, and means to record the signals produced by said detector on a strip moving at a constant velocity as a function of $1/d$, $d$ being the interplanar spacing.

References Cited in the file of this patent

UNITED STATES PATENTS

| | | |
|---|---|---|
| 2,540,821 | Harker | Feb. 6, 1951 |
| 2,648,011 | Good | Aug. 4, 1953 |
| 2,798,957 | Hoblen et al. | July 9, 1957 |
| 2,819,405 | Bond | Jan. 17, 1958 |
| 2,837,655 | Lang | June 3, 1958 |
| 2,898,469 | Rose | Aug. 4, 1959 |
| 2,926,258 | Weissman | Feb. 23, 1960 |
| 2,928,945 | Arndt | Mar. 15, 1960 |
| 2,951,157 | Haine et al. | Aug. 30, 1960 |
| 3,005,098 | Buschmann | Oct. 17, 1961 |